Patented Aug. 25, 1942

2,293,855

UNITED STATES PATENT OFFICE 2,293,855

PRODUCTION OF COATED MATERIALS

George Schneider, Montclair, N. J., assignor to Celanese Corporation of America, a corporation of Delaware No Drawing. Application July 1, 1939, Serial No. 282,426

8 Claims. (Cl. 117—110)

This invention relates to the coating of sheet materials with thermoplastic compositions, and relates more particularly to the application of coatings comprising mixed esters of cellulose to surfaces of sheet material.

An object of my invention is to form coatings in a simple, economic and expeditious manner on fabric, paper, wood, composition board, metal or any porous, flexible or rigid sheet material.

Another object of my invention is to prepare coatings of compositions comprising mixed esters of cellulose upon surfaces of porous sheet material, which coatings are supple, flexible and strong, have little tendency to crack on sharp bending, have a desirable appearance and do not become tacky on exposure to atmospheric conditions.

A further object of this invention is the application of plastic compositions containing mixed esters of cellulose to surfaces of sheet material without the use of solvents or extraneous adhesives.

Still another object of this invention is the provision of an improved coating composition for application to sheet material, which composition requires a lesser amount of plasticizer than coating compositions heretofore employed for yielding the desired softness in the finished product, thus minimizing the tendency of the coating towards sweating and stickiness.

Other objects of this invention will appear from the following detailed description and claims.

In the coating of fabrics and the like for the preparation of artificial leather and similar products solutions of cellulose derivatives such as cellulose acetate and cellulose nitrate have heretofore been employed. This method was open to many serious objections such as expense, toxicity of some of the solvents used and the large number of successive coatings which were necessary to build up a layer of even the minimum thickness required to mask the texture of the base material. In the coating of wood or other porous surface, solutions of derivatives of cellulose used as coating compositions do not fill but tend to bridge over the grain of the wood or other surfaces and, consequently, such surfaces must be given a preliminary treatment with a filler or the like. When hardwood, metallic or other surfaces are to be covered, ordinary solutions of derivatives of cellulose in volatile solvents cannot be used because of the lack of adhesion of the resulting film to such surfaces and it is therefore necessary to incorporate in such solutions, in order to impart the necessary adhesive properties to the resulting film, substances such as gums and resins. The latter introduced complications such as lack of compatibility of the derivative of cellulose, poor light fastness and water resistance, and the tendency to develop brittleness.

In another process which has been used heretofore, a cellulose acetate together with a pigment and a plasticizer were ground together in a colloid mill in the presence of an excess of water and then the water was removed from the mixture of the cellulose acetate, pigment and plasticizer by drying. This dried mixture was then fed into a calender roll arrangement and when the mixture became sufficiently fluid it was applied to the base material. In such a process a calender roll temperature on the order of 150 to 160° C. was necessary to render the mixture sufficiently fluid in order to coat the base material. Furthermore, it was found that unless extreme care was taken the conversion of the cellulose acetate was not completed, undissolved or unconverted particles of cellulose acetate being present in the coating. Another difficulty in carrying out this process was that the plastic material had a tendency to over-run the ends of the calender rolls and to work its way into the bearings of said rolls. Moreover, in such a process a high ratio of the plasticizer to the cellulose acetate in the thermoplastic composition was required and, due to this high plasticizer content, the coated fabric had a tendency to sweat.

I have found that the disadvantages attending the use of solutions of derivatives of cellulose such as cellulose nitrate and cellulose acetate in volatile solvents and the other expedients previously proposed for coating surfaces with such derivatives of cellulose not only may be overcome, but products of superior properties may be obtained, by applying a layer containing one or more mixed esters of cellulose together with other desired constituents directly to the surface to be coated solely by means of heat and pressure and without the aid of adhesives. Moreover, the coating composition of my invention need contain no, or substantially no, volatile solvents. In order to obtain the proper bonding action and to avoid the overheating of the coating composition with its consequent deleterious effects, the surface of the material to be coated may be preheated to a temperature at least equal to that required to render plastic the composition to be applied, while the coating composition itself may also be preheated, so that upon application of pressure a firmly adherent union is obtained. After the application of heat and pressure, the coated or laminated product may be chilled in any suitable manner. Preferably, however, the cooling or chilling should be effected through the layer or article that has been coated. In this manner, the maximum heating and chilling effects are obtained in the most important location, namely, the surface contact of the coating composition and the article that is coated, so that a perfect bonding of the coating composition to the base material is obtained. Any suitable mixed ester of cellulose may be employed in accordance with this invention. I prefer, however, to employ cellulose aceto-propionate and cellulose aceto-butyrate.

Suitable modifying agents may be incorporated with the mixed ester of cellulose to form the coating composition. By "modifying agent" is meant any substance which is adapted to impart any desired properties such as softness, elasticity, flexibility, hardness, gloss, color, stability, etc. to the finished product. Such modifying agents may be plasticizers, dyes, pigments, lakes, filling materials, resins, oils, etc. Examples of plasticizers are camphor, methyl methoxy ethyl phthalate, dimethoxy ethyl phthalate, diethyl phthalate, triacetin, tricresyl phosphate, ethyl orthotoluene sulphonamide, ethyl paratoluene sulphonamide, etc. The oil employed in accordance with this invention may be a mineral or vegetable oil. Oils which I have found to be particularly suitable are the oxidized formal of castor oil, the formal of castor oil, blown castor oil, oxidized olive oil, acetylated polymerized castor oil, rape seed oil, Perilla oil, Russian mineral oil, and olive oil. I prefer however to employ the oxidized formal of castor oil, which is prepared by oxidizing the condensation product from castor oil and formaldehyde, since a greater amount of this softening may advantageously be incorporated in the coating composition of this invention.

The coating composition is preferably applied to or laminated with the surface to be treated while the said composition is in the substantially completely converted state. Thus, a layer of an intimate mixture of a mixed cellulose ester and a plasticizer therefor, with or without a modifying agent but containing substantially no volatile solvents, may be applied to the surface to be coated and the assembly pressed at an elevated temperature. As indicated above, the surface to be coated is preferably preheated.

While the coating composition of this invention may be converted in any suitable manner, the optimum results are obtained by first partially converting the composition by mixing together 100 parts of a mixed ester of cellulose, 60 to 85 parts of plasticizers, 5 to 20 parts of oil, coloring matter if desired, and, where a swelling agent is desired, 80 to 100 parts of ethyl alcohol, all parts being by weight, in a suitable mixer for a short period of time and then permitting the mixture to stand covered for a further period of time or until a jel is formed. This jel is transferred to a steam-jacketed mixer while the composition is further partially converted, clarified and its alcohol content reduced. Preferably, however, the mixed cellulose ester, plasticizer, oil and alcohol are mixed together in an S-type Werner-Pfleiderer mixer for about 15 minutes and permitted to stand covered for about sixteen hours whereupon a very viscous semi-transparent jel is formed, since conversion has begun to take place during this sixteen hour soaking period. The steam-jacketed mixer to which the jel is transferred is preferably a Z-type Werner-Pfleiderer mixer. This mixer containing the jel is operated with its cover on for from 5 to 15 minutes and with its cover off for from 5 to 30 minutes, the maximum temperature being from 70 to 80° C. The alcoholic content of the composition after the second mixing is 30 to 60 parts by weight per 100 parts by weight of the mixed ester of cellulose. The composition is now quite tacky but can readily be removed from the mixer. This tacky plastic composition is then removed to malaxating rolls where it is completely converted after 5 to 10 minutes and substantially all of the alcohol driven off. In place of alcohol, hot water, wet steam or a mixture of water and acetone may be employed.

In another manner of forming the coating composition, a mixed ester of cellulose is ground to a fine powder and then mixed with a plasticizer, an oil and effect material, where such material is desired. The mixture is then placed upon the heated rolls of a malaxating machine and there worked until a fully converted mass is obtained. This fully converted mass is then ready for use to coat the base material.

In accordance with my process foils, films or sheets are formed in an operation which is continuous with that in which they are applied to the desired base or surface. In this case a mixed ester of cellulose composition in the form of a fully converted mass and in a plastic state is passed between heated rolls that are so spaced as to form the foils, films or sheets of desired thickness. The foils, films or sheets thus produced are then continuously applied to the surface to be coated and subjected to the action of heat and pressure to bind the same to said surface. In the process of the present invention the mixed ester of cellulose coating composition releases, without the aid of a doctoring knife or blade, from the calender roll to the base material being coated.

In applying the foils, films or sheets continuously with the formation thereof, a great saving in time is effected since only a short contact under pressure is required to obtain the proper bonding action, particularly when the base and the plastic sheet material are suitably preheated. Since the mixed ester of cellulose composition gradually absorbs heat as it passes from roller to roller, it does not blister and is of uniform texture and even gauge throughout, and is free of air bubbles regardless of its thickness. Excessive heat and/or pressure is not required in the coating or laminating operation and there is, therefore, no danger of undue flow of material causing uneven application of the plastic composition on the base, or of deleterious effect on the plastic composition.

During the coating operation it is essential that the surface of the article to be coated should be of sufficiently high temperature. Preferably the articles to be coated should be preheated, that is, they should be heated prior to the application of the coating composition thereto. By employing this expedient it is not necessary to apply excessive heat to the thermoplastic composition in order that it may pass through and heat the surface of contact between said thermoplastic material and the base.

I have found that very satisfactory results are obtained by having the temperature of the calcomposition is transferred to a five roll calender operated at a temperature of 145° to 160° C. where the plastic is applied to sateen which is preheated to a temperature of about 145° C.

The coated sateen produced is supple, flexible and strong and shows little tendency to crack on sharp bending. The plastic adherence to the sateen is firm.

*Example III*

100 parts of cellulose aceto-propionate which had been ground to a fine powder (40 to 50 mesh) is mixed with 80 parts of dimethoxy ethyl phthalate and 10 parts of the oxidized formal of castor oil, all parts being by weight, in a Banbury mixer for about thirty minutes. The mixture is then removed to malaxating rolls heated to a temperature of 120 to 125° C. and worked thereon until it is completely converted. The converted plastic mass is transferred to a five roll calender operated at a temperature of 145 to 160° C. where the plastic mass is applied to cotton drill cloth which has been preheated to a temperature of about 145° C.

The coated drill cloth produced is supple, flexible and strong and shows little tendency to crack or tear on sharp bending. The coating adheres to the drill cloth very firmly.

*Example IV*

100 parts of cellulose aceto-butyrate which had been ground to a fine powder (40 to 50 mesh) is mixed with 70 parts of dimethoxy ethyl phthalate and 15 parts of oxidized formal of castor oil, all parts being by weight, in a Banbury mixer for about thirty minutes. The mixture is then removed to malaxating rolls heated to a temperature of 120 to 125° C. and worked thereon until it is completely converted. The converted plastic mass is transferred to a five roll calender operated at a temperature of 145 to 160° C. where the plastic mass is applied to cotton drill cloth which has been preheated to a temperature of about 145° C.

The coated drill cloth produced is supple, flexible and strong and shows little tendency to crack or tear on sharp bending. The coating adheres to the drill cloth very firmly.

It is to be understood that the foregoing description is given merely by way of illustration and that many variations may be made therein, without departing from the spirit of my invention.

Having described my invention what I desire to secure by Letters Patent is:

1. Process for the production of coated materials by a calendering process, which comprises mixing together a mixed ester of cellulose, a plasticizer therefor, and a substantially volatile swelling agent for the mixed ester of cellulose, allowing the mixture to stand until a gel is formed, subjecting the gel to the action of heat in a closed vessel for a short period, and then for a further short period in an open vessel, until the content of swelling agent has been substantially reduced, then working the mixture on malaxating rolls until substantially all the swelling agent has been removed, and thereafter transferring the converted mixture thus obtained to calendering rolls and uniting the converted mixture to a base material in the substantial absence of solvent for the mixed ester of cellulose.

2. Process for the production of coated material by a calendering process, which comprises mixing together cellulose aceto-propionate, a plasticizer therefor, and a substantially volatile swelling agent for the cellulose aceto-propionate, allowing the mixture to stand until a gel is formed, subjecting the gel to the action of heat in a closed vessel for a short period, and then for a further short period in an open vessel, until the content of swelling agent has been substantially reduced, then working the mixture on malaxating rolls until substantially all the swelling agent has been removed, and thereafter transferring the converted mixture thus obtained to calendering rolls and uniting the converted mixture to a base material in the substantial absence of solvent for the cellulose aceto-propionate.

3. Process for the production of coated material by a calendering process, which comprises mixing together cellulose aceto-butyrate, a plasticizer therefor, and a substantially volatile swelling agent for the cellulose aceto-butyrate, allowing the mixture to stand until a gel is formed, subjecting the gel to the action of heat in a closed vessel for a short period, and then for a further short period in an open vessel, until the content of swelling has been substantially reduced, then working the mixture on malaxating rolls until substantially all the swelling agent has been removed, and thereafter transferring the converted mixture thus obtained to calendering rolls and uniting the converted mixture to a base material in the substantial absence of solvent for the cellulose aceto-butyrate.

4. Process for the production of coated materials by a calendering process, which comprises mixing together a mixed ester of cellulose, a plasticizer therefor, and a substantially volatile swelling agent for the mixed ester of cellulose, allowing the mixture to stand until a gel is formed, subjecting the gel to the action of heat in a closed vessel for ten minutes, and then for fifteen minutes in an open vessel, until the content of swelling agent has been substantially reduced, then working the mixture on malaxating rolls until substantially all the swelling agent has been removed, and thereafter transferring the converted mixture thus obtained to calendering rolls and uniting the converted mixture to a base material in the substantial absence of solvent for the mixed ester of cellulose.

5. Process for the production of coated materials by a calendering process, which comprises mixing together cellulose aceto-propionate, dimethoxy ethyl phthalate, oxidized formal of castor oil and ethyl alcohol, allowing the mixture to stand until a gel is formed, subjecting the gel to the action of heat in a closed vessel for a short period, and then for a further short period in an open vessel, until substantially all of the ethyl alcohol has been removed, and thereafter transferring the converted mixture thus obtained to calendering rolls and uniting the converted mixture to a base material in the substantial absence of solvent for the cellulose aceto-propionate.

6. Process for the production of coated materials by a calendering process which comprises mixing together cellulose aceto-butyrate, dimethoxy ethyl phthalate, oxidized formal of castor oil and ethyl alcohol, allowing the mixture to stand until a gel is formed, subjecting the gel to the action of heat in a closed vessel for a short period, and then for a further short period in an open vessel, until substantially all of the ethyl alcohol has been removed, and thereafter transender rolls between 145° to 160° C. and the temperature of the fabric being coated about 145° C. Where the coating composition to be applied to the fabric contains a filler, the temperature of the calender rolls is preferably about 170° C.

After the layer of the coating composition is applied to the base by the application of heat and pressure, the uncoated or underside of the coated surface is cooled or chilled. This cooling or chilling step causes the plastic sheet to shrink into the pores or interstices of the base material into which pores or interstices it had previously been drawn or forced due to the heat applied thereto.

While any suitable mechanical devices, such as presses, may be employed for obtaining the required heating, pressing and cooling effects, I prefer to employ rolls for this purpose. Indeed one of the advantages of my invention is that it permits the coating of surfaces with mixed ester of cellulose plastics by means of rolls, which render possible an extremely high rate of production.

By my invention surfaces of all kinds may be coated. Woven or knitted fabrics made of cotton or other fibers may be coated by this invention, as may also paper, cardboard, pulp, leather and other flexible articles. Sheets, blocks or other articles made of wood, cork, rubber, asbestos board or other relatively porous materials likewise may have a coating of a thermoplastic composition applied thereto. Metals such as steel, iron, nickel, copper, aluminum, in sheet, strip or other form, may likewise be successfully coated. Not only may relatively wide, thin articles such as plates, fabrics and the like be treated by this invention, but continuous lengths of ribbons, rods, profile strips, tubes, moldings, corset stays, insulated wire, lead pencils and the like may have a coating of thermoplastic compounds applied on all surfaces thereof by this invention.

Another application of this invention is in the preparation of specialties, such as netting of cotton, reconstituted cellulose and the like that is covered with a thin layer of thermoplastic composition and adapted to be used in the making of transparent mothproof clothes bags or for wrapping purposes. Likewise, woven wire cloth of various mesh, from fine insect screening to chicken fencing, may have the layer of thermoplastic composition applied thereto in order to close the interstices with a transparent or translucent film of cellulose derivative composition and the resulting product may be used as glass substitutes in poultry houses, greenhouses, storerooms, warehouses and the like. For making such materials, the cloth of reticulated material and the layer of thermoplastic composition are caused to pass between the heated roller, the film being deposited in the meshes without bubbles or so called "crater" effects which occur when a solution of a cellulose derivative in volatile solvent is applied to such materials.

Heretofore, as stated above, large amounts of plasticizer were required to produce a coated fabric of the desired degree of softness. The use of such large amounts of plasticizer made it necessary to saponify the surface of the derivative of cellulose coating to prevent said surface from becoming tacky. It is one of the advantages of the process of the present invention that it is not necessary to saponify the surface. The relatively small amount of plasticizer employed minimizes the tendency of the surface to become sticky or tacky.

While this invention is applicable to the coating of various articles, it is of particular advantage in the coating of cotton fabrics to form artificial leather. The artificial leather formed in accordance with this invention is supple, flexible and strong, and shows little tendency to crack upon sharp bending. The mixed ester of cellulose coating composition is completely converted and where pigment is employed it is evenly dispersed throughout the composition. Moreover, the coating composition adheres tenaciously to the base fabric.

Any suitable device may be employed for carrying out my invention as for example the device diagrammatically shown and described in my U. S. Patent No. 2,236,766.

By the term "conversion" as employed herein is meant that the mixed ester of cellulose is so intimately mixed with the plasticizer that the mixed ester of cellulose in the resulting composition is in a colloidal, as distinguished from a solid, form.

In order further to illustrate my invention, but without being limited thereto, the following specific examples are given.

*Example I*

100 parts of dry ground cellulose aceto-propionate are mixed with 80 parts of dimethoxy ethyl phthalate, 10 parts of the oxidized formal of castor oil and 80 parts of ethyl alcohol, all parts being by weight in an S-type Werner-Pfleiderer mixer for fifteen minutes. The mixture is then permitted to stand covered for about sixteen hours. The resulting very viscous semi-transparent jel is removed to a Z-type Werner-Pfleiderer steam-jacketed mixer where it is mixed for ten minutes with the cover of the mixer on and for fifteen minutes with the cover off, the temperature of the mixer being 75° C. The alcohol content of the composition after this latter mixing is approximately 45 parts per 100 parts of cellulose aceto-propionate. The tacky plastic mass is removed from the latter mixer to malaxating rolls heated to a temperature of 125° C. where the batch is completely converted after about ten minutes of operation. The converted plastic mass is transferred to a five roll calendar operated at a temperature of 145° to 160° C. where the plastic mass is applied to cotton drill cloth which is preheated to a temperature of about 145° C.

The coated drill cloth produced is supple, flexible and strong and shows little tendency to crack on sharp bending. The plastic adherence to the drill cloth is firm.

*Example II*

100 parts of dry ground cellulose aceto-butyrate are mixed with 70 parts of dimethoxy ethyl phthalate, 15 parts of the oxidized formal of castor oil and 60 parts of ethyl alcohol, all parts being by weight, in an S-type Werner-Pfleiderer mixer for fifteen minutes. The mixture is then permitted to stand covered for about sixteen hours. The resulting very viscous semi-transparent jel is removed to a Z-type Werner-Pfleiderer steam-jacketed mixer where it is mixed for ten minutes with the cover of the mixer on and for fifteen minutes with the cover off, the temperature of the mixer being 75° C. The alcohol content of the composition after this latter mixing is approximately 45 parts per 100 parts of cellulose aceto-butyrate. The tacky plastic mass is removed from the latter mixer to malaxating rolls heated to a temperature of 125° C. where the batch is completely converted after ten minutes of operation. The converted plastic ferring the converted mixture thus obtained to calendering rolls and uniting the converted mixture to a base material in the substantial absence of solvent for the cellulose aceto-butyrate.

7. Process for the production of coated material by a calendering process, which comprises mixing together cellulose aceto-propionate, dimethoxy ethyl phthalate, oxidized formal of castor oil and ethyl alcohol, allowing the mixture to stand until a gel is formed, subjecting the gel to the action of heat in a closed vessel for ten minutes, and then for fifteen minutes in an open vessel, until substantially all of the ethyl alcohol has been removed, and thereafter transferring the converted mixture thus obtained to calendering rolls and uniting the converting mixture to a base material in the substantial absence of solvent for the cellulose aceto-propionate.

8. Process for the production of coated material by a calendering process, which comprises mixing together cellulose aceto-butyrate, dimethoxy ethyl phthalate, oxidized formal of castor oil and ethyl alcohol, allowing the mixture to stand until a gel is formed, subjecting the gel to the action of heat in a closed vessel for ten minutes, and then for fifteen minutes in an open vessel, until substantially all of the ethyl alcohol has been removed, and thereafter transferring the converted mixture thus obtained to calendering rolls and uniting the converted mixture to a base material in the substantial absence of solvent for the cellulose aceto-butyrate.

GEORGE SCHNEIDER.